Aug. 17, 1926.
H. BROWN
1,596,798
MEANS FOR MEASURING RESPIRED AIR IN TESTING LUNGS AND FOR ANALOGOUS PURPOSES
Filed Nov. 2, 1925
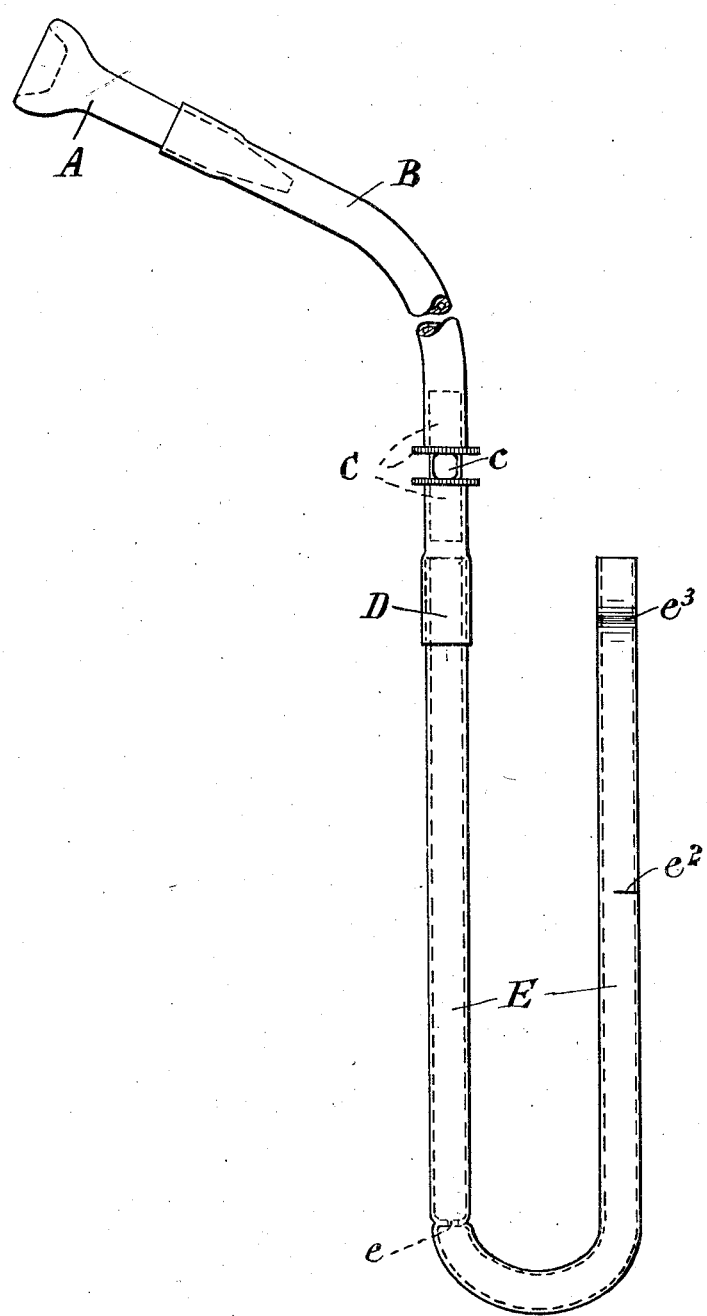
INVENTOR
HAYDN BROWN
BY HIS ATTORNEYS
Howson and Howson Patented Aug. 17, 1926.

1,596,798

UNITED STATES PATENT OFFICE.

HAYDN BROWN, OF LONDON, ENGLAND.

MEANS FOR MEASURING RESPIRED AIR IN TESTING LUNGS AND FOR ANALOGOUS PURPOSES.

Application filed November 2, 1925, Serial No. 66,419, and in Great Britain September 23, 1924.

My invention relates to improved means whereby the condition of the lungs and their action in breathing can be ascertained as regards their capacity and power and my invention has for its principal object to provide an instrument in which the amount of resistance to the entry of the respired or exhaled air is reduced to a minimum and which owing to its simplicity of structure neither friction nor moisture can vitiate even after being used for long periods of time.

My invention comprises essentially a length of flexible tubing provided at one end with a mouthpiece, the other end fitting over one end of a junction piece in which an aperture is formed (instead of an aperture of predetermined size in the tubing itself) to allow for the escape of part of the exhaled air. The proximal limb of a U tube is attached to the other end of the junction piece by means of a short length of tubing the said limb being formed with a constriction of its lumen at or near its bend, while on the distal limb of the said U tube I provide a graduation mark. The upper ends of the limbs may be slightly curved to facilitate the application of stoppers placed in the ends of the tube when it is not being used, and to reduce the possibility of liquid escaping from the tube when it is laid down.

The accompanying drawing illustrates by way of example a form of construction according to my invention. A indicates the mouthpiece, B the length of tubing, C the junction piece with aperture $c$, and D the short length of tubing. The U tube E is constricted at $e$, $e^2$ is the graduation mark and $e^3$ indicates the curve which may be formed towards the upper ends of the said tube. When the instrument is to be used to measure the exhaled air water is poured into the said U tube up to about half the vertical length of its limbs. If desired a mark may be placed upon the U tube to denote this level. The patient then breathes out through the mouthpiece at a fairly regular rate so as to cause the water in the tube to be depressed in the proximal limb and to rise to the graduation mark in the distal limb and be there maintained during one exhalation, the constriction in the tube facilitating this by lessening the tendency of the water to rapidly rise or fall.

In conjunction with this instrument I employ a stop watch which records seconds and which may also be calibrated to read cubic inches or centimeters. When the water is raised to the graduation mark in the tube the operator releases the watch mechanism and when the water falls below the said mark in the tube, the watch is stopped and the reading taken as indicated by the hand on the watch.

As the pressure at which the air is exhaled is a definite and constant quantity depending upon the distance of the mark $e^2$ above the middle of the distal limb of the U tube, the period of time measured by the stop watch will be proportional to the volume of air which has passed through the aperture $c$ during the period of an exhalation. The watch may therefore be marked to indicate the capacity in cubic inches or cubic centimetres direct. When the junction piece is formed, therefore, the aperture may be made of a size predetermined to pass a given quantity of exhaled air in a given time at a known pressure.

The graduation in seconds on the dial of the stop watch concentric with the cubic graduations renders it easy by comparison with a watch, or clock, for the latter to be used in place of the stop watch and also as a means whereby the accuracy of the stop watch may be tested by comparison with an ordinary time piece.

The process of measuring lung capacity, then, consists merely in blowing respired air against liquid whose level indicates pressure, and permitting it to escape through the aperture described, while noting the time as explained above.

What I claim is:—

1. The improved means for measuring respired air for testing lungs, and for analogous purposes, comprising a U-tube having a constriction of its lumen near its bend, in combination with a junction piece having an aperture of a size predetermined to pass a given quantity of exhaled air in a given time at a known pressure, and flexible tubing connecting said U-tube with said junction piece.

2. The improved means for measuring respired air for testing lungs, and for analogous purposes, comprising a U-tube having a constriction of its lumen near its bend there being a graduation mark upon said U-tube for denoting pressure, in combination with a junction piece having an aperture whose size is adapted to pass a given quantity of exhaled air in a given time at the pressure indicated by the liquid level at the mark, and flexible tubing connecting said U-tube with said junction piece.

In testimony whereof I have signed my name to this specification.

HAYDN BROWN.